(12) United States Patent
Alholm et al.

(10) Patent No.: US 12,093,060 B2
(45) Date of Patent: Sep. 17, 2024

(54) GEOMETRIC CONTROL ENVELOPE SYSTEM AND METHOD FOR LIMITING COMMANDS TO ACTUATOR MAPPING FUNCTION

(71) Applicant: Digital Aerolus, Inc., Lenexa, KS (US)

(72) Inventors: Jeffery J. Alholm, Kansas City, MO (US); John C. Blessing, Kansas City, KS (US); Jacob B. Davisson, Lawrence, KS (US); Thomas D. Williams, Shutesbury, MA (US)

(73) Assignee: Digital Aerolus, Inc., Lenexa, KS (US)

( * ) Notice: Subject to any disclaimer, the term of this patent is extended or adjusted under 35 U.S.C. 154(b) by 355 days.

(21) Appl. No.: 17/588,629

(22) Filed: Jan. 31, 2022

(65) Prior Publication Data

US 2022/0244744 A1   Aug. 4, 2022

Related U.S. Application Data (60) Provisional application No. 63/143,209, filed on Jan. 29, 2021.

(51) Int. Cl.
  *G05D 1/00*    (2024.01)
  *B64C 39/02*   (2023.01)
  *B64U 101/00*  (2023.01)

(52) U.S. Cl.
  CPC ........... *G05D 1/085* (2013.01); *B64C 39/024* (2013.01); *G05D 1/106* (2019.05); *B64U 2101/00* (2023.01); *B64U 2201/10* (2023.01)

(58) Field of Classification Search
  None
  See application file for complete search history.

(56) References Cited

U.S. PATENT DOCUMENTS 10,467,913 B1 *   11/2019   Suiter ................. G08G 5/0021
10,496,096 B2    12/2019   McEwan
2006/0106533 A1   5/2006   Hirokawa
(Continued)

FOREIGN PATENT DOCUMENTS

WO        2017/134658 A1    8/2017
WO   WO-2021262325 A2 *   12/2021   ............... B64B 1/44

OTHER PUBLICATIONS

Search Report and Written Opinion dated Apr. 14, 2022 for related PCT Patent Application No. PCT/US2022/014514; 13 pages.

*Primary Examiner* — Hunter B Lonsberry
*Assistant Examiner* — Robert Louis Pinkerton
(74) *Attorney, Agent, or Firm* — Hovey Williams LLP; Kameron D. Kelly (57) ABSTRACT

A vehicle and method of control comprising generating a geometric control envelope in a geometric space of operation points defined by a number of control aspects, the envelope having vertices representing maximum values of the control aspects, and determining a desired operation point in the geometric space representing a control input. Further, the method includes if the desired operation point is outside the envelope, scaling up a first one of the control aspects by a first factor, determining an effective operation point in the envelope geometrically closest to the desired operation point, scaling down all of the control aspects by a second factor inverse of the first factor, and instructing the propulsion mechanisms to propel the vehicle according to the effective operation point.

22 Claims, 9 Drawing Sheets

(56) References Cited

U.S. PATENT DOCUMENTS

| | | | |
|---|---|---|---|
| 2014/0339372 A1* | 11/2014 | Dekel | B64C 39/024 244/7 R |
| 2015/0197335 A1* | 7/2015 | Dekel | G05D 1/0858 701/5 |
| 2016/0363937 A1 | 12/2016 | Becker et al. | |
| 2017/0154535 A1 | 6/2017 | Downey et al. | |
| 2019/0056739 A1 | 2/2019 | Kumar et al. | |
| 2019/0179345 A1 | 6/2019 | McEwan et al. | |

* cited by examiner

FIG. 10

GEOMETRIC CONTROL ENVELOPE SYSTEM AND METHOD FOR LIMITING COMMANDS TO ACTUATOR MAPPING FUNCTION

RELATED APPLICATIONS

This regular utility non-provisional patent application claims priority benefit with regard to all common subject matter of earlier filed U.S. Provisional patent application titled "GEOMETRIC CONTROL ENVELOPE SYSTEM AND METHOD FOR LIMITING COMMANDS TO ACTUATOR MAPPING FUNCTION", Ser. No. 63/143,209, filed on Jan. 29, 2021, which is hereby incorporated by reference in its entirety into the present application.

BACKGROUND

Control systems for drones and other vehicles including air vehicles, water vehicles, and land-based vehicles often map desired flight commands such as translation, rotation, velocity, angular velocity, acceleration, angular acceleration, thrust, or torque to motor commands or other actuator commands to bring about a corresponding motion. However, motors and actuators cannot always perform the behavior that is requested via a simple motor mapping function. This can be due to hitting maximum or minimum limits of motor settings.

SUMMARY

Embodiments of the present invention solve the above-described problems and other problems and limitations by providing an improved autonomous or semi-autonomous vehicle and method for controlling the same. Certain control aspects are managed differently via the present invention than in existing control approaches for safer, more predictable, and more successful flight.

An embodiment of the invention is a drone broadly comprising a chassis, a number of motors, a number of rotors, and a control system. Other autonomous or semi-autonomous devices or vehicles such as robots, crawling devices, throwable devices, driving devices, digging devices, climbing devices, floating devices, submersible devices, and space-borne devices may be used.

The chassis supports the other components of the drone. The chassis may include rotor guards, landing gear or landing supports, payload holders, and other suitable structures.

The motors drive the rotors and may be any suitable motion-generating components such as electric motors, actuators, and gas-powered engines. It will be understood that other propulsion systems such as rockets, jets, compressed gas expulsion systems, and maglev systems may be used. The motors may be variable speed or single speed motors. Each motor may drive one of the rotors. Alternatively, a single motor may be used to drive all of the rotors.

The rotors propel the drone through the air under power from the motors and may be fixed pitch rotors, variable pitch rotors, tiltrotors, propellers, or the like. As mentioned above, other propulsion systems such as rockets, jets, and compressed gas expulsion systems may be used.

The control system controls the drone and includes a camera, a number of sensors, a transceiver, and a processor. The control system may be incorporated entirely in the drone itself or may include or may be in wired or wireless communication with external control or reference devices or systems such as handheld controllers, smartphones, remote computers, GPS satellites, homing bases, and other drones.

The camera may provide environmental feedback and may be a digital camera or video camera, infrared camera or sensor, proximity camera or sensor, radar or lidar transceiver, or any other suitable environmental sensor. The camera may be stationary or controllable for increasing its sensing area and may be used for capturing images, video recordings, and other data.

The sensors sense positions, movement, acceleration, physical manipulation or aspects of physical manipulation of the drone, and flight conditions and other information associated with flight such as such as relative airspeed, air density, air temperature, direction of movement, current location, obstacle proximity or contact, motor speeds, battery power, and the like. The sensors may be or may include accelerometers, inertial measurement units (IMUs), motion sensors, proximity sensors, pressure sensors, cameras, gimbals, radar detectors, lidars, avionics, multi-axis gyroscopic chips, multi-axis accelerometers, magnetometers, ultrasonic distance sensors or any other suitable sensing devices.

The transceiver sends and receives wireless signals between the control system and external devices, sensors, computing systems, remote controllers, and/or other autonomous or semi-autonomous devices. The transceiver may operate in any suitable frequency on the electromagnetic scale. For example, the transceiver may be a radio frequency transceiver or line of sight transceiver. The transceiver (or an additional transceiver) may also receive global positioning system (GPS) data.

The processor interprets data from the camera and sensors and controls the drone according to the interpreted data and other inputs, as described in more detail below. The processor may include a circuit board, memory, and other electronic components such as a display and inputs for receiving external commands and a transmitter for transmitting data and electronic instructions.

The processor may implement aspects of the present invention with one or more computer programs stored in or on computer-readable medium residing on or accessible by the processor. Each computer program preferably comprises an ordered listing of executable instructions for implementing logical functions and controlling the drone according to physical manipulations and other inputs. Each computer program can be embodied in any non-transitory computer-readable medium, such as a memory (described below), for use by or in connection with an instruction execution system, apparatus, or device, such as a computer-based system, processor-containing system, or other system that can fetch the instructions from the instruction execution system, apparatus, or device, and execute the instructions.

The memory may be any computer-readable non-transitory medium that can store the program for use by or in connection with the instruction execution system, apparatus, or device. The computer-readable medium can be, for example, but not limited to, an electronic, magnetic, optical, electro-magnetic, infrared, or semi-conductor system, apparatus, or device. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM).

The control system may control the drone as follows. First, user flight inputs are received by the control system (e.g., via transceiver), or automated flight inputs are received or generated by the control system. The control system may then generate flight commands, via higher-level flight controls, corresponding to various control aspects such as torque and thrust.

The processor may then utilize geometric control via a geometric control model to balance yaw authority, control, efficiency, torque, thrust, and other control aspects for the drone. The processor may then map desired operation points or effective operation points determined from the previous step to actual motor commands. The processor may then instruct the motors to operate according to the actual motor commands.

The sensors may then detect physical manipulation, aspects of the physical manipulation, and flight conditions and other information associated with flight to generate sensor feedback. The sensor feedback may then be transmitted to the control system to generate additional flight commands, via the higher-level flight controls, thus completing a feedback loop.

Regarding geometric control, the control system generates or references, or updates a geometric control envelope in a geometric space of the geometric control model for balancing yaw authority, control, efficiency, torque, thrust, and other control aspects for the drone.

In one embodiment, yaw may be managed differently in light of three other control aspects: thrust, roll, and pitch. Roll and pitch may be combined in the geometric control model as "tilt," which is the amount of attitude rotation of the drone's horizontal plane that provides control (besides yaw and thrust). Attitude may constitute how the drone moves laterally and maintains stable flight (ignoring yaw/heading and altitude).

In one embodiment, the geometric control model may incorporate four dimensions corresponding to four control aspects, and specifically tilt, yaw, thrust, and theta (described below) into three dimensions of the geometric space. More specifically, tilt, yaw, and thrust values may be projected based on a current theta value. Other dimensions representing individual motor temperatures, average motor temperatures, battery voltage, drone mass drone moments of inertia, other actuator states (such as in the case of a vertical takeoff and landing (VTOL) drone with both horizontal rotors and a fixed wing with control surfaces), and other aspects may also be used. The geometric control envelope may be mathematically projected in the geometric control model to have a particular shape such as a wedge-pyramid shape as discussed in more detail below.

Flight commands/control inputs are represented in the geometric control model as desired operation points, with desired operation points inside the geometric control envelope corresponding to flight commands within an acceptable range of operation for all four motors. In one embodiment, the control method prevents any of the motors from being driven higher than 100% or lower than 0% via the geometric control envelope.

As mentioned previously, the control system adapts flight commands to be within the acceptable range of operation for all four motors by using operation points inside the geometric control envelope. Specifically, the processor may determine if a desired operation point is in the geometric control envelope. If the desired operation point is in the geometric control envelope, the control system uses the corresponding flight command without adaptation. That is, the processor may then map the desired operation point to motor commands and instruct the motors to operate according to the desired operation point.

If the desired operation point is outside the geometric control envelope, a closest point in the geometric control envelope may be used (i.e., an effective operation point). Without this determination, commanded torques and thrusts can lead to drastically different torques and thrusts on the drone versus what was desired.

In effect, if a flight command requires a rotational attitude torque, yaw torque, and/or thrust that is undesirable or impossible to achieve due to motor limitations (e.g., a motor setting higher than 100% or lower than 0%), leading to an unstable control condition, the control system temporarily lessens one or more of the attitude torque, yaw torque, and thrust to ensure flight stability. Once control is regained in certain control aspects, such as attitude and thrust, the control system may revert other control aspects, such as yaw, back to full authority.

The control method may also prioritize certain control aspects, which is simplified via the geometric control model. This can be thought of as a "fly by wire" implementation for the control system to at least partially and subtly override or supplement user inputs and the higher-level controls to prevent a crash (including flying into a wall in an undesired way). As an exemplary embodiment, the control method may prioritize attitude over thrust and prioritizes attitude and thrust over yaw. These priorities may be changed and rearranged as needed by adjusting scaling constants.

The dimensions of yaw, tilt, and thrust, or other control aspects, on the geometric control envelope may be scaled in a manner which gives priority to the control aspect considered to be the most important according to a hierarchy of priority between control aspects. This scaling may be done prior to finding the closest point. For example, the tilt axis of the geometric control envelope may be scaled up by an initial scaling factor before finding the closest point on the scaled geometric control envelope. After finding the closest point, then all of the dimensions may be rescaled by the reciprocal of the initial scaling factor. The rescaled closest point will have a tilt value which is very close to the tilt value of the desired operation point. On the other hand, if the tilt axis scaling was less, then the closest point on the geometric control envelope would be further away from the tilt value of the desired operation point.

The processor may then map the closest point (i.e., the effective operation point) to motor commands and instruct the motors to operate according to the effective operation point. Utilizing the closest point instead of a desired operation point outside of the geometric control envelope ensures the flight commands are not dramatically effectively modified by the motor mapping.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment", "an embodiment", or "embodiments" mean that the feature or features referred to are included in at least one embodiment of the invention. Separate references to "one embodiment", "an embodiment", or "embodiments" in this description do not necessarily refer to the same embodiment and are not mutually exclusive unless so stated. Specifically, a feature, structure, act, etc. described in one embodiment may also be included in other embodiments but is not necessarily included. Thus, particular configurations of the present invention can include a variety of combinations and/or integrations of the embodiments described herein.

Figure 1:
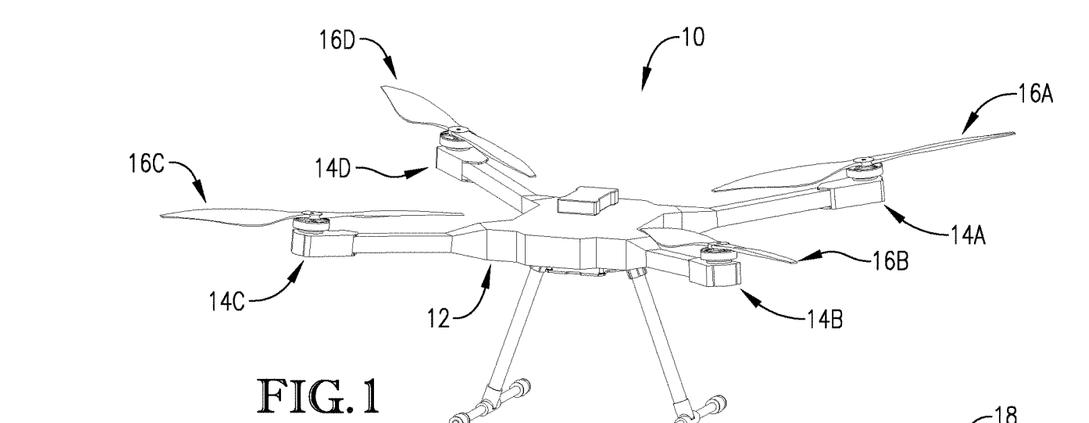
FIG. 1 is a perspective view of an unmanned aerial vehicle constructed in accordance with an embodiment of the invention.
Figure 2:
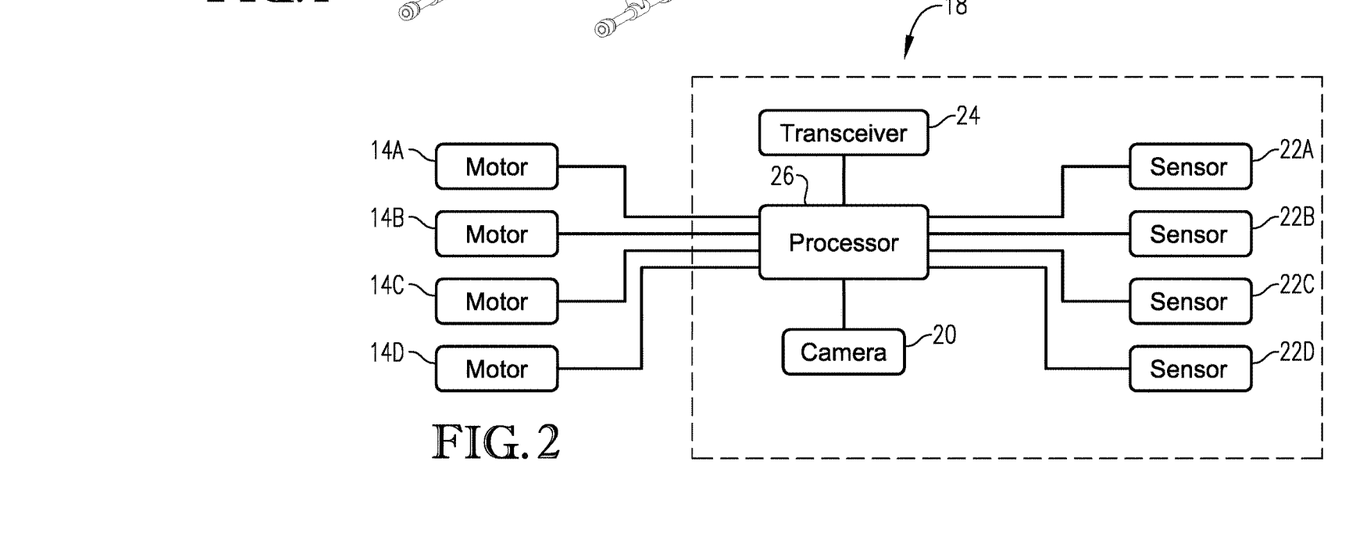
FIG. 2 is a schematic diagram of certain components of the unmanned aerial vehicle of FIG. 1.

Turning to FIGS. 1 and 2, a drone 10 constructed in accordance with an embodiment of the present invention is illustrated. The drone 10 broadly comprises a chassis 12, a plurality of motors 14A-D, a plurality of rotors 16A-D, and a control system 18. Other autonomous or semi-autonomous devices or vehicles such as robots, crawling devices, throwable devices, driving devices, digging devices, climbing devices, floating devices, submersible devices, and space-borne devices may be used.

The chassis 12 supports the other components of the drone 10 and may include rotor guards, landing gear or landing supports, payload holders, and other suitable structures. The chassis 12 may be a monolithic structure or an assemblage of connected structures.

The motors 14A-D drive the rotors 16A-D and may be any suitable motion-generating components such as electric motors, actuators, and gas-powered engines. It will be understood that other propulsion systems such as rockets, jets, compressed gas expulsion systems, and maglev systems may be used. The motors 14A-D may be variable speed or single speed motors. Each motor 14A-D may drive one of the rotors 16A-D. Alternatively, a single motor may be used to drive all of the rotors 16A-D.

The rotors 16A-D thrust the drone 10 through the air under power from the motors 14A-D and may be fixed pitch rotors, variable pitch rotors, tiltrotors, propellers, or the like. As mentioned above, other propulsion systems such as rockets, jets, and compressed gas expulsion systems may be used.

The drone 10 may also include effectors for directing acceleration forces and/or for changing attitude or orientation of the drone 10. The effectors may be control surfaces, steering mechanisms, rudders, diving planes, ailerons, exhaust directors, rotors, rotating wings, and the like. The effectors may be controlled by or given mechanical power by motors and actuators, and the like. The effectors may be commanded by signals from the processor of the control system described below. The motors 14A-D, rotors 16A-D, and effectors may cooperatively be called "propulsion mechanisms".

The control system 18 controls the drone 10 and includes a camera 20, a plurality of sensors 22A-D, a transceiver 24, and a processor 26. The control system 18 may be incorporated entirely in the drone 10 itself or may include or may be in wired or wireless communication with external control or reference devices or systems such as handheld controllers, smartphones, remote computers, GPS satellites, homing bases, and other drones.

The camera 20 may provide environmental feedback and may be a digital camera or video camera, infrared camera or sensor, proximity camera or sensor, radar or lidar transceiver, or any other suitable environmental sensor. The camera 20 may be stationary or controllable for increasing its sensing area and may be used for capturing images, video recordings, and other data.

The sensors 22A-D sense positions, movement, acceleration, physical manipulation or aspects of physical manipulation of the drone 10, and flight conditions and other information associated with flight such as such as relative airspeed, air density, air temperature, direction of movement, current location, obstacle proximity or contact, motor speeds, battery power, and the like. The sensors 22A-D may be or may include accelerometers, inertial measurement units (IMUs), motion sensors, proximity sensors, pressure sensors, cameras, gimbals, radar detectors, lidars, avionics, multi-axis gyroscopic chips, multi-axis accelerometers, magnetometers, ultrasonic distance sensors or any other suitable sensing devices.

The transceiver 24 sends and receives wireless signals between the control system 18 and external devices, sensors, computing systems, remote controllers, and/or other autonomous or semi-autonomous devices. The transceiver 24 may operate in any suitable frequency on the electromagnetic scale. For example, the transceiver 24 may be a radio frequency transceiver or line of sight transceiver. The transceiver 24 (or an additional transceiver) may also receive global positioning system (GPS) data.

The processor 26 interprets data from the camera 20 and sensors 22A-D and controls the drone 10 according to the interpreted data and other inputs, as described in more detail below. The processor 26 may include a circuit board, memory, and other electronic components such as a display and inputs for receiving external commands and a transmitter for transmitting data and electronic instructions.

The processor 26 may implement aspects of the present invention with one or more computer programs stored in or on computer-readable medium residing on or accessible by the processor. Each computer program preferably comprises an ordered listing of executable instructions for implementing logical functions and controlling the drone 10 according to physical manipulations and other inputs. Each computer program can be embodied in any non-transitory computer-readable medium, such as a memory (described below), for use by or in connection with an instruction execution system, apparatus, or device, such as a computer-based system, processor-containing system, or other system that can fetch the instructions from the instruction execution system, apparatus, or device, and execute the instructions.

The memory may be any computer-readable non-transitory medium that can store the program for use by or in connection with the instruction execution system, apparatus, or device. The computer-readable medium can be, for example, but not limited to, an electronic, magnetic, optical, electro-magnetic, infrared, or semi-conductor system, apparatus, or device. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM).

Figure 7:
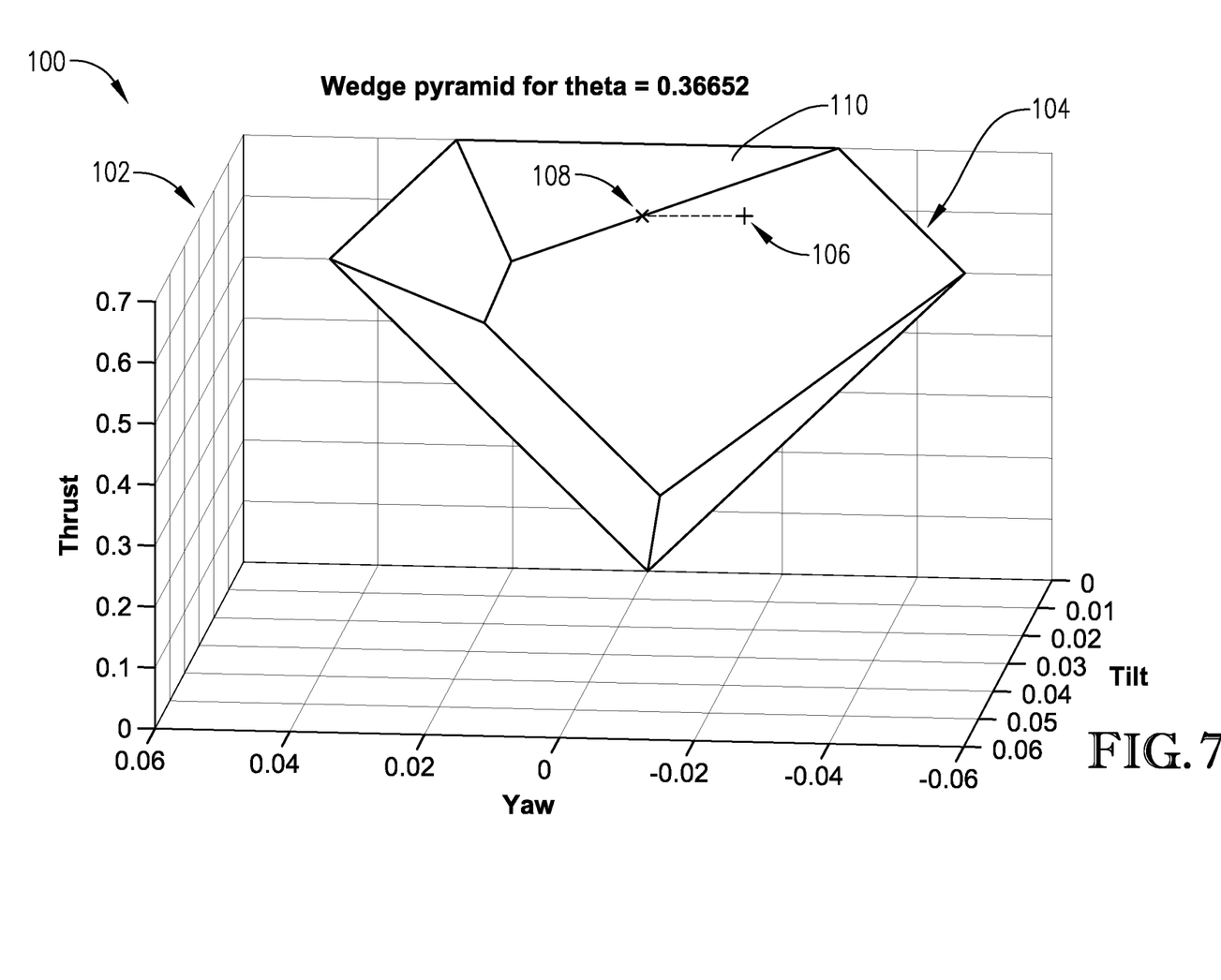
FIG. 7 is another perspective projection of the geometric control envelope of FIG. 3.
Figure 8:
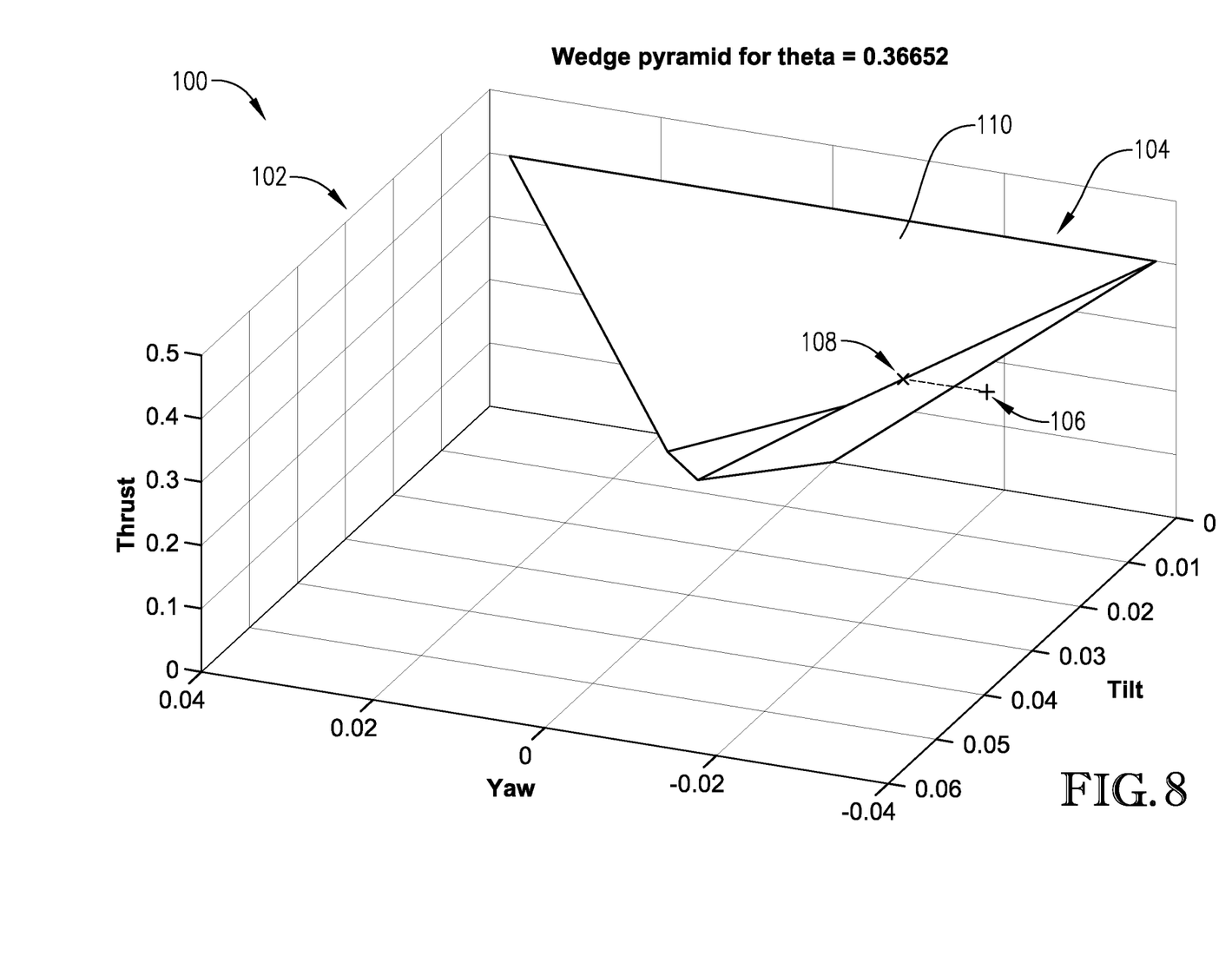
FIG. 8 is another perspective projection of the geometric control envelope of FIG. 3.
Figure 9:
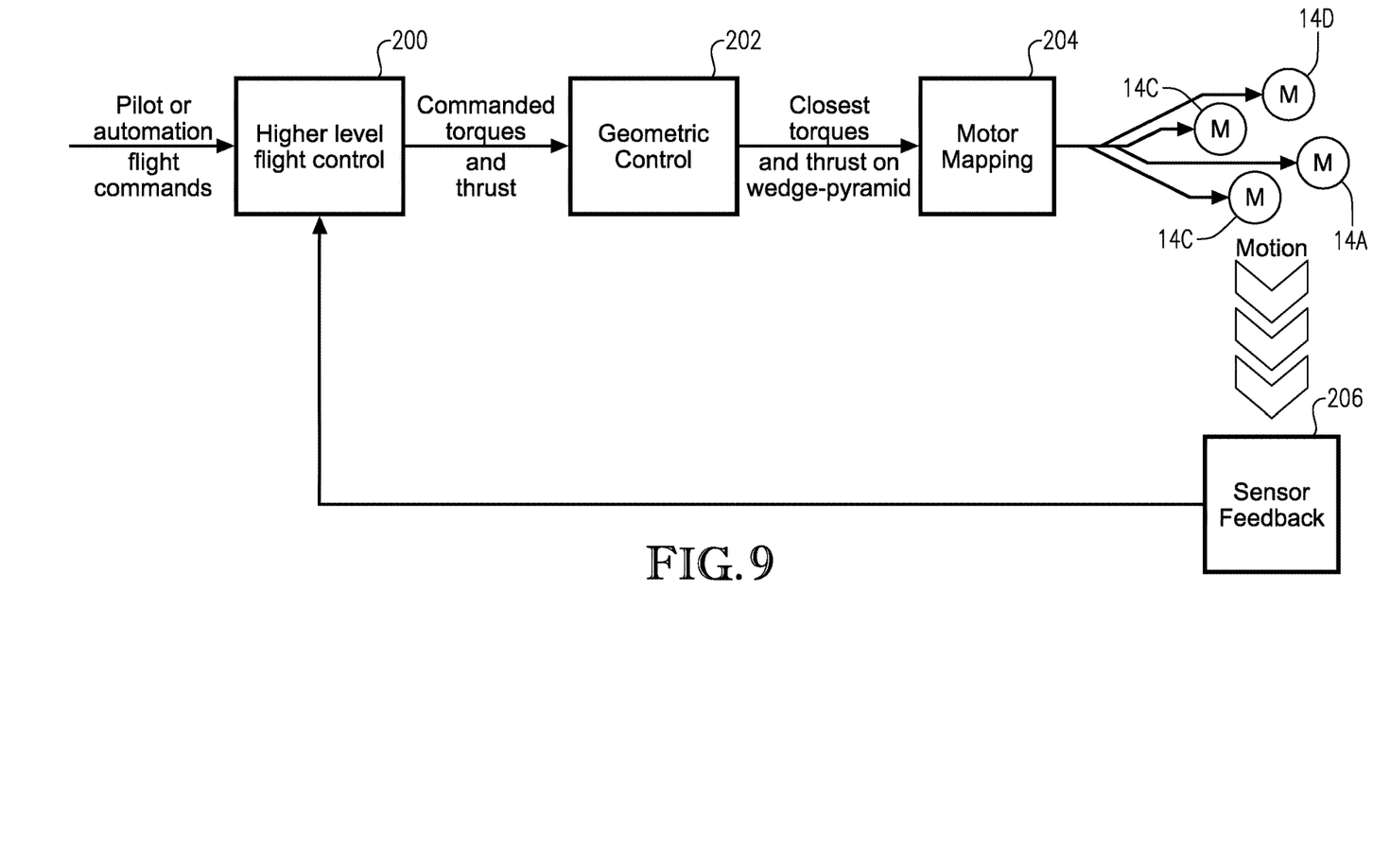
FIG. 9 flow diagram of certain steps of a method according to another embodiment of the invention.
Figure 10:
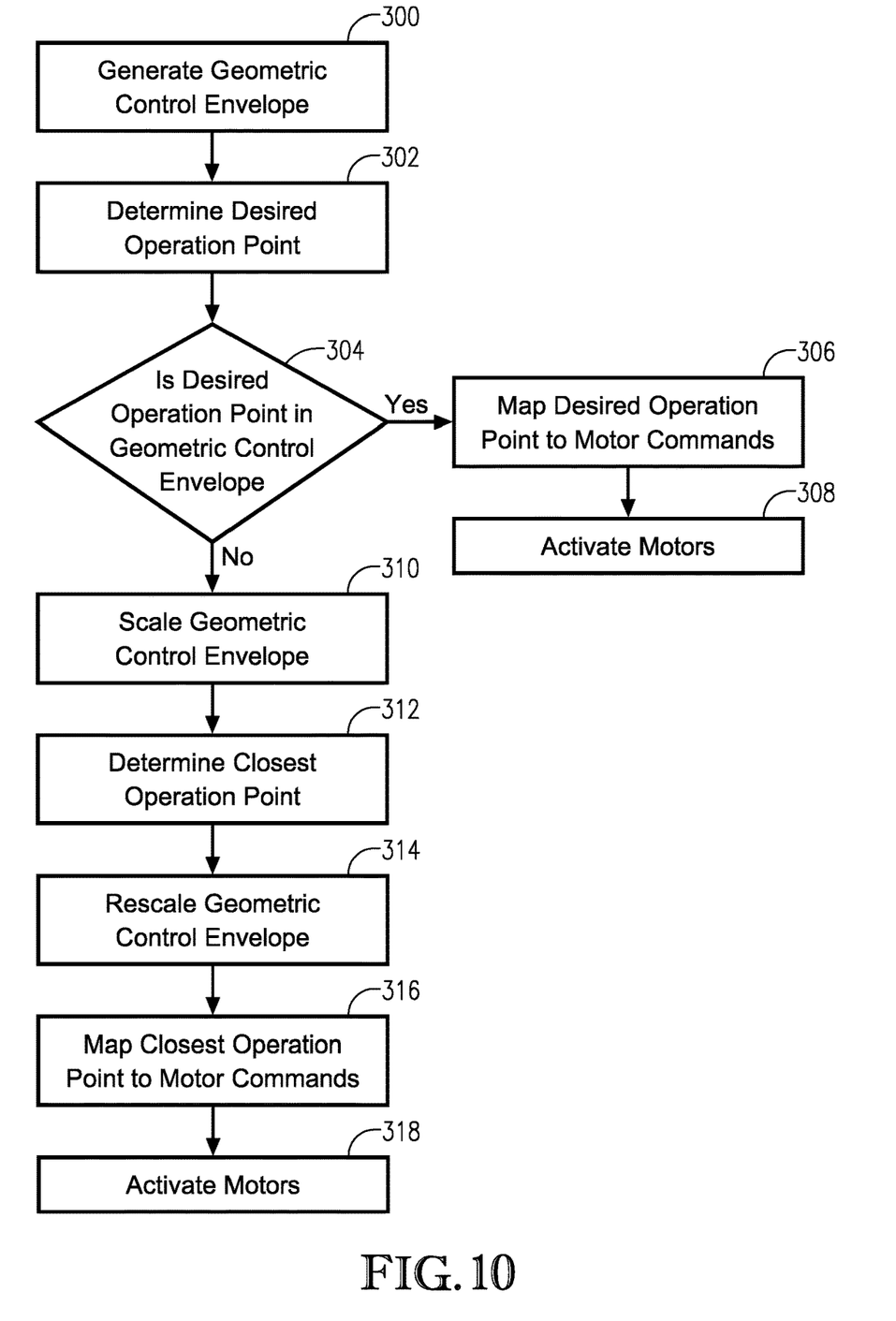
FIG. 10 is a flow diagram of certain steps of a method according to another embodiment of the invention.

Turning to FIGS. 9 and 10, and with reference to FIGS. 3-8, a method of controlling the drone 10 (hereinafter "control method") implemented via the control system 18 will now be described in more detail. First, user flight inputs are received by the control system 18 (e.g., via transceiver 24), or automated flight inputs are received or generated by the control system 18. The control system 18 may then generate flight commands, via higher-level flight controls, corresponding to various control aspects such as torque and thrust, as shown in block 200.

The processor 26 may then utilize geometric control via a geometric control model, such as geometric control model 100, to balance yaw authority, control, efficiency, torque, thrust, and other control aspects for the drone 10, as shown in block 202. This will be discussed in more detail below.

The processor 26 may then map desired operation points or effective operation points determined from the previous step to actual motor commands, as shown in block 204. The processor 26 may then instruct the motors 14A-D to operate according to the actual motor commands.

The sensors 22A-D may then detect physical manipulation, aspects of the physical manipulation, and flight conditions and other information associated with flight to generate sensor feedback, as shown in block 206. The sensor feedback may then be transmitted to the control system 18 to generate additional flight commands, via the higher-level flight controls, thus completing a feedback loop.

Turning to FIG. 10, and with further reference to FIGS. 3-8, geometric control via the geometric control model 100 will now be discussed in more detail. Specifically, the control system 18 generates or references, or updates a geometric control envelope 104 in a geometric space 102 of the geometric control model 100 for balancing yaw authority, control, efficiency, torque, thrust, and other control aspects for the drone 10, as shown in block 300.

In one embodiment, yaw may be managed differently in light of three other control aspects: thrust, roll, and pitch. Roll and pitch may be combined in the geometric control model 100 as "tilt," which is the amount of attitude rotation of the drone's horizontal plane that provides control (besides yaw and thrust). Attitude may constitute how the drone 10 moves laterally and maintains stable flight (ignoring yaw/heading and altitude).

In one embodiment, the geometric control model 100 may incorporate four dimensions corresponding to four control aspects, and specifically tilt, yaw, thrust, and theta (described below) into three dimensions of the geometric space 102. More specifically, tilt, yaw, and thrust values may be projected based on a current theta value. Other dimensions representing individual motor temperatures, average motor temperatures, battery voltage, drone mass drone moments of inertia, other actuator states (such as in the case of a vertical takeoff and landing (VTOL) drone with both horizontal rotors and a fixed wing with control surfaces), and other aspects may also be used. The geometric control envelope 104 may be mathematically projected in the geometric control model 100 to have a particular shape such as a wedge-pyramid shape as discussed in more detail below.

Flight commands/control inputs are represented in the geometric control model 100 as desired operation points, with desired operation points inside the geometric control envelope 104 corresponding to flight commands within an acceptable range of operation for all four motors 14A-D, as shown in block 302. In one embodiment, the control method prevents any of the motors 14A-D from being driven higher than 100% or lower than 0% via the geometric control envelope 104.

As mentioned previously, the control system 18 adapts flight commands to be within the acceptable range of operation for all four motors 14A-D by using operation points inside the geometric control envelope 104. Specifically, the processor 26 may determine if a desired operation point is in the geometric control envelope 104, as shown in block 304. If the desired operation point is in the geometric control envelope 104, the control system 18 uses the corresponding flight command without adaptation. That is, the processor 26 may then map the desired operation point to motor commands (block 306) and instruct the motors 14A-D to operate according to the desired operation point (block 308).

If the desired operation point (e.g., desired operation point 106) is outside the geometric control envelope 104, a closest point (e.g., closest point 108) in the geometric control envelope 104 may be used (i.e., an effective operation point). Without this determination, commanded torques and thrusts can lead to drastically different torques and thrusts on the drone 10 versus what was desired. Note that the terms "in" and "inside" are inclusive of face points, edge points, and corner points of the geometric control envelope 104. The term "outside" designates points that are not in the geometric control envelope 104.

In effect, if a flight command requires a rotational attitude torque, yaw torque, and/or thrust that is undesirable or impossible to achieve due to motor limitations (e.g., a motor setting higher than 100% or lower than 0%), leading to an unstable control condition, the control system 18 temporarily lessens one or more of the attitude torque, yaw torque, and thrust to ensure flight stability. Once control is regained in certain control aspects, such as attitude and thrust, the control system 18 may revert other control aspects, such as yaw, back to full authority.

The control method may also prioritize certain control aspects, which is simplified via the geometric control model 100. This can be thought of as a "fly by wire" implementation for the control system 18 to at least partially and subtly override or supplement user inputs and the higher-level controls to prevent a crash (including flying into a wall in an undesired way). As an exemplary embodiment, the control method may prioritize attitude over thrust and prioritizes attitude and thrust over yaw. These priorities may be changed and rearranged as needed by adjusting scaling constants.

The dimensions of yaw, tilt, and thrust, or other control aspects, on the geometric control envelope 104 may be scaled in a manner which gives priority to the control aspect considered to be the most important according to a hierarchy of priority between control aspects, as shown in block 310. This scaling may be done prior to finding the closest point 108 (block 312). For example, the tilt axis of the geometric control envelope 104 may be scaled up by an initial scaling factor before finding the closest point 108 on the scaled geometric control envelope 104. After finding the closest point 108, then all of the dimensions (including the closest point 108) may be rescaled by the reciprocal of the initial scaling factor, as shown in block 314. The rescaled closest point 108 will have a tilt value which is very close to the tilt value of the desired operation point 106. On the other hand, if the tilt axis scaling was less, then the closest point 108 on the geometric control envelope 104 would be further away from the tilt value of the desired operation point 106. As an example, the tilt dimension may be scaled up by a factor of approximately 20 prior to finding the closest point 108 so that the closest point's tilt value remains nearly the same as the tilt value of the desired operation point 106 while sacrificing much more of the yaw primarily and thrust secondarily. However, in many combinations of tilt, yaw, and thrust, the reductions may occur in all three axes.

The processor 26 may then map the closest point 108 (i.e., the effective operation point) to motor commands (block 316) and instruct the motors 14A-D to operate according to the effective operation point, as shown in block 318. Utilizing the closest point 108 instead of a desired operation point outside of the geometric control envelope 104 ensures the flight commands are not dramatically effectively modified by the motor mapping.

Figure 3:
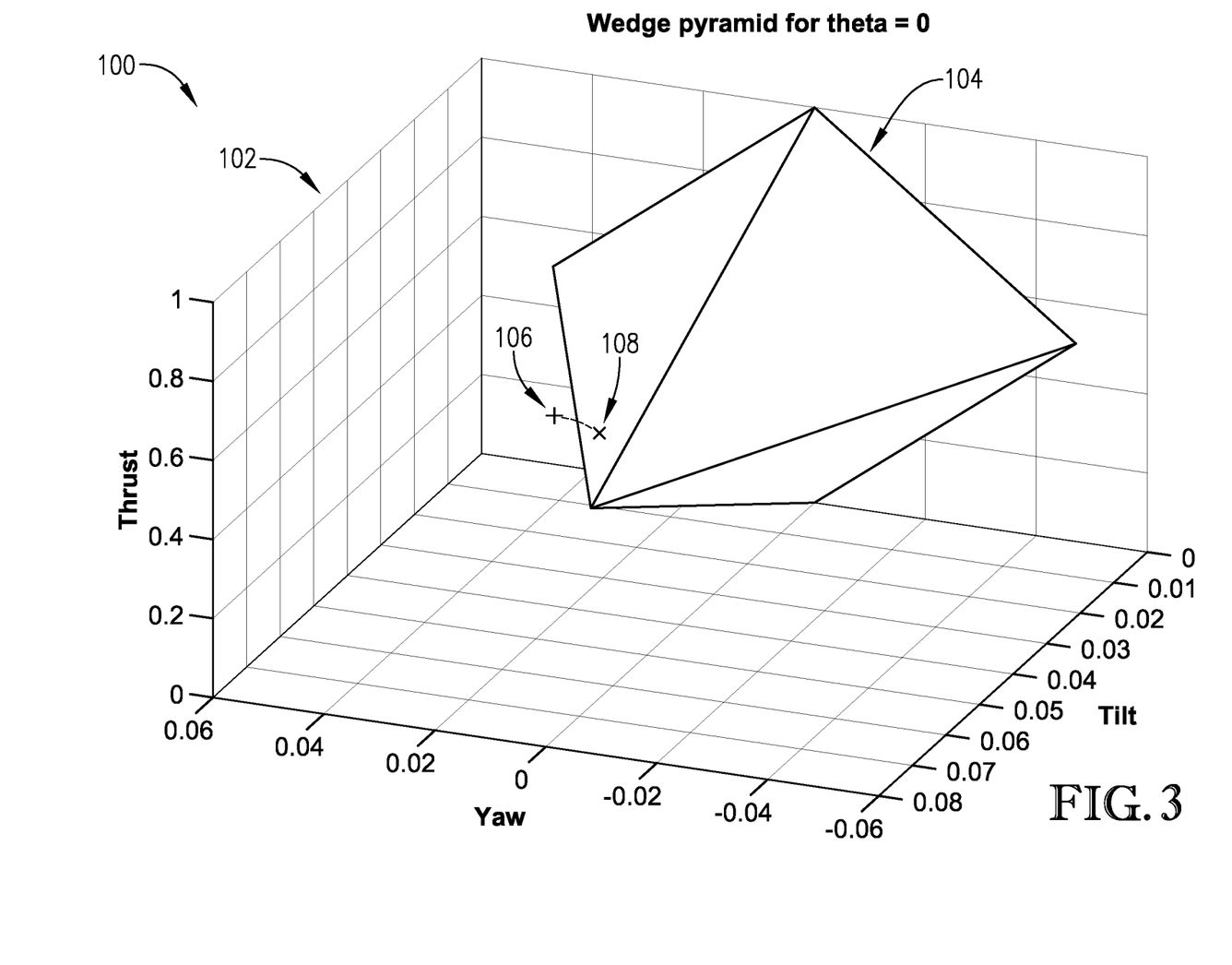
FIG. 3 is a perspective projection of a geometric control envelope in accordance with an embodiment of the invention.
Figure 4:
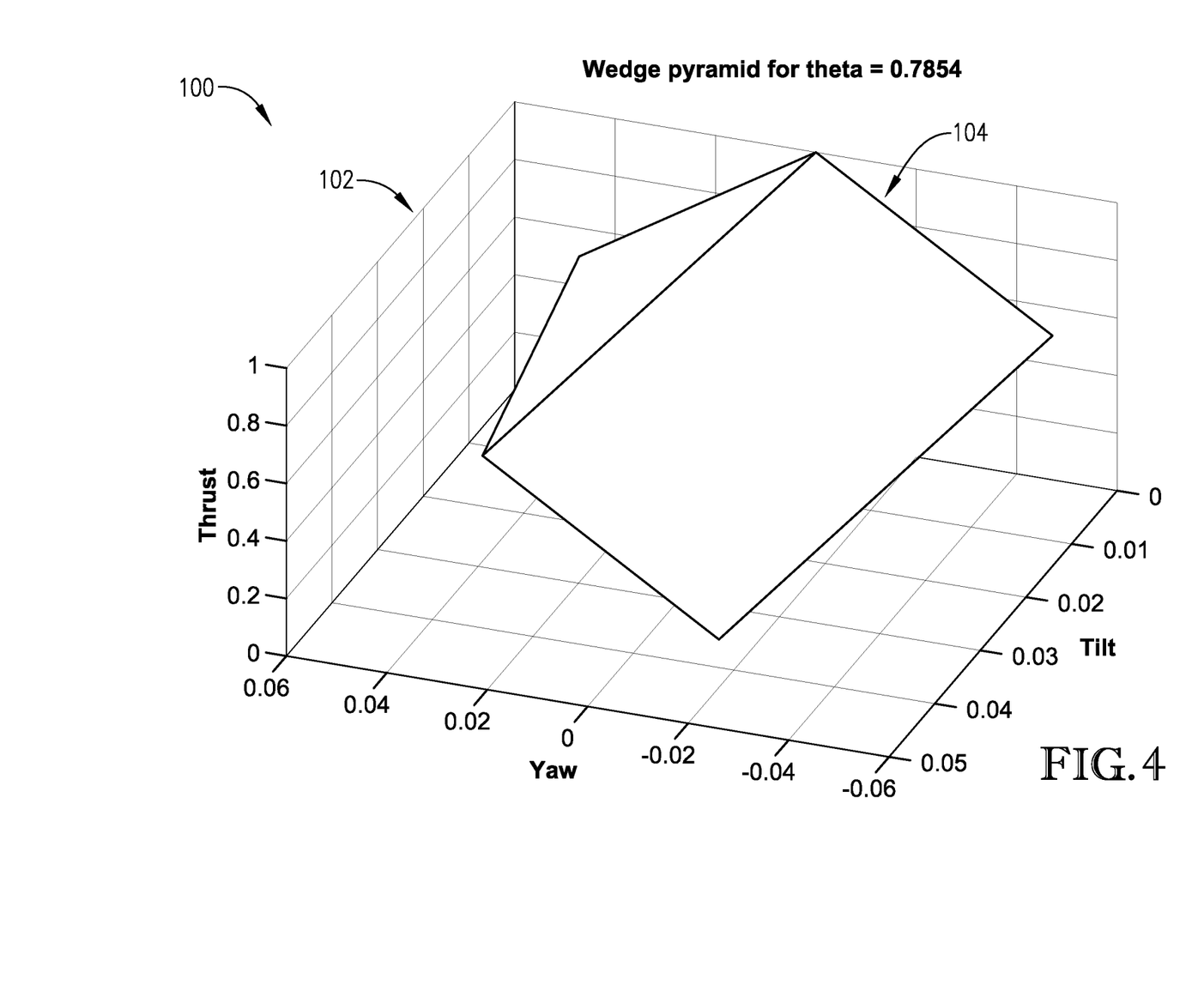
FIG. 4 is another perspective projection of the geometric control envelope of FIG. 3.
Figure 5:
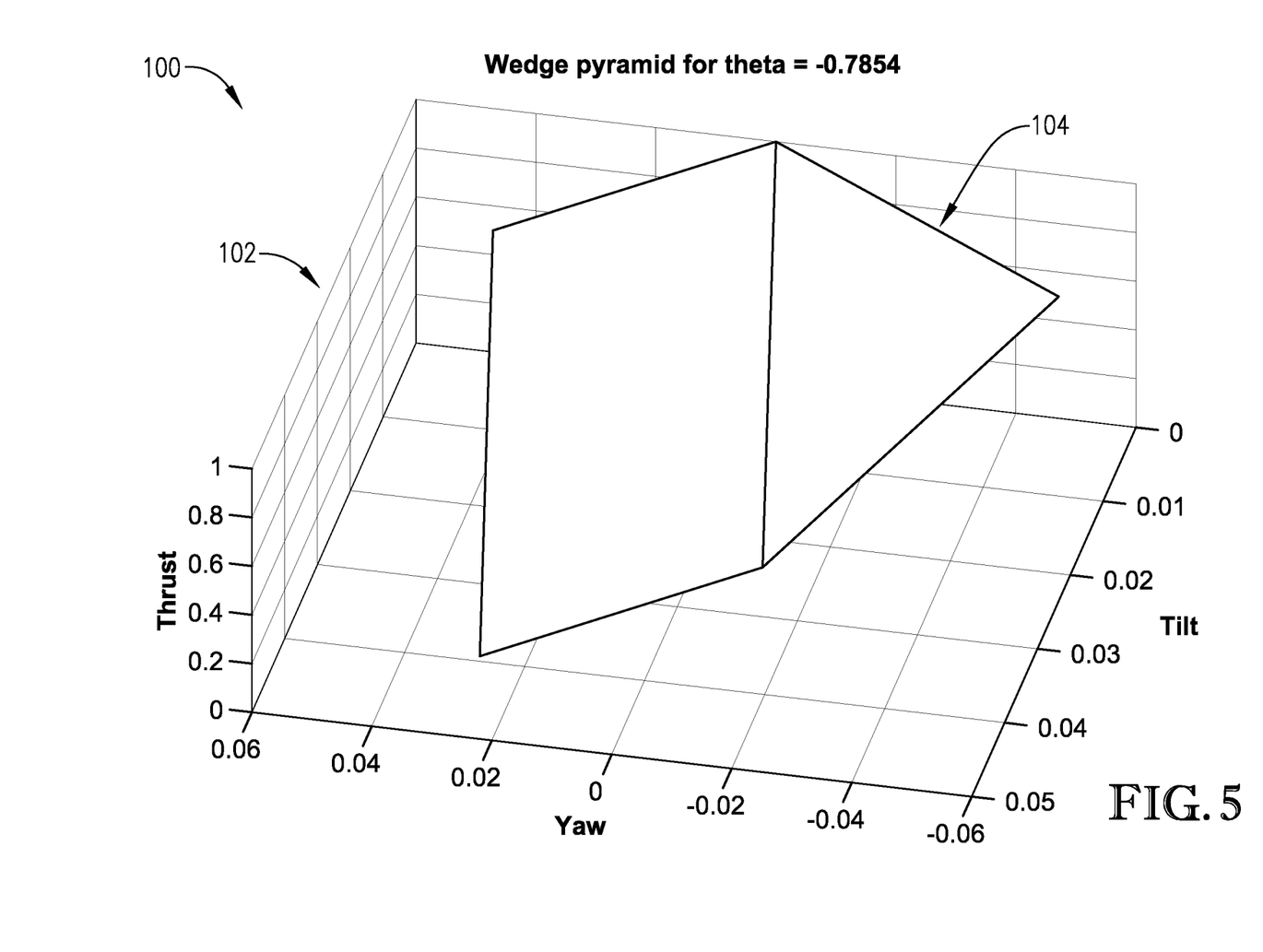
FIG. 5 is another perspective projection of the geometric control envelope of FIG. 3.
Figure 6:
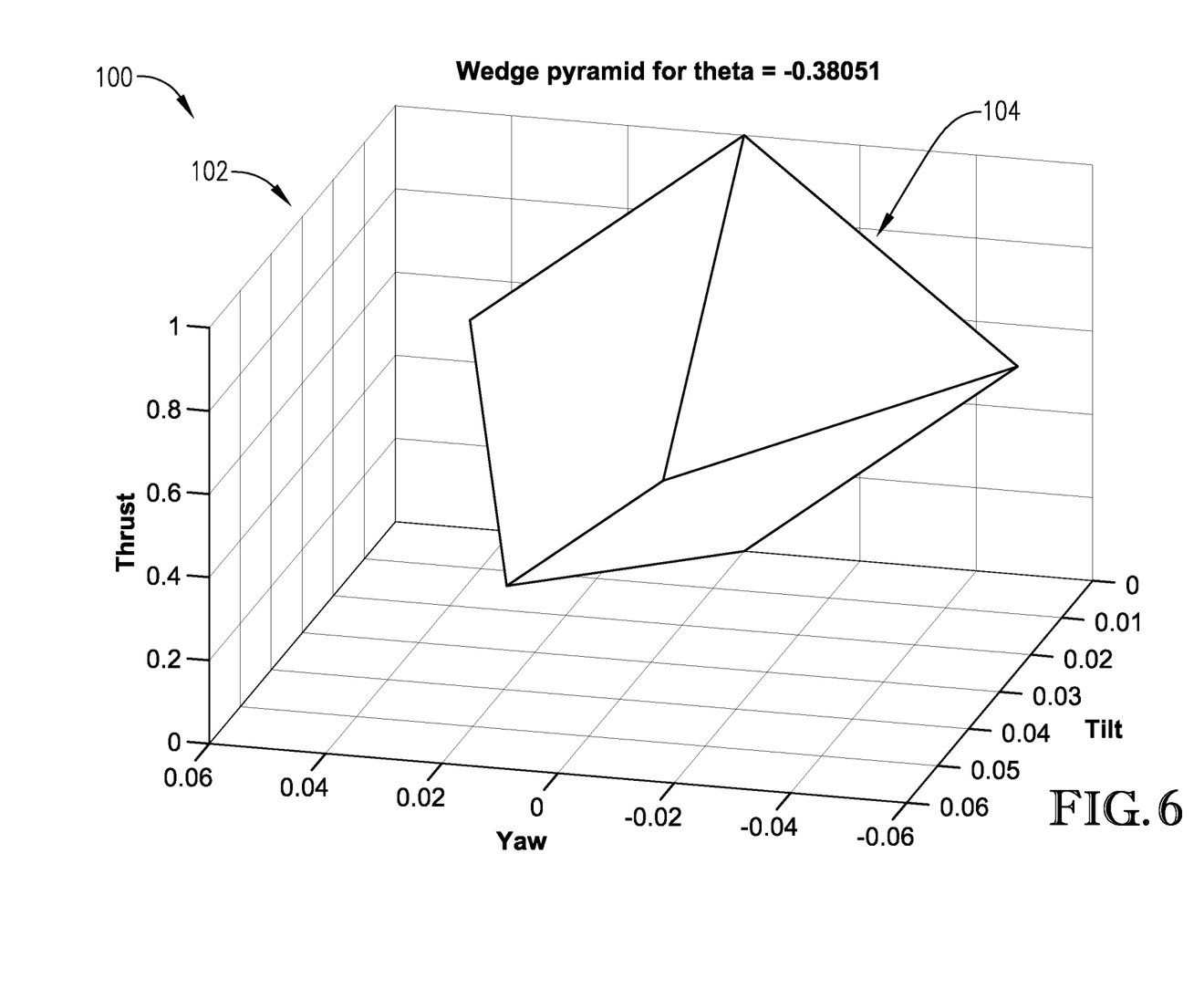
FIG. 6 is another perspective projection of the geometric control envelope of FIG. 3.

The geometric control envelope 104 will now be discussed in more detail. The geometric control envelope 104 may use standard geometric shapes whose sides can be considered control projection surfaces. This allows logic and priorities for maintaining stability to be described easily in geometric terms. The particular shape of the geometric control envelope 104 may be dictated by several factors such as number, physical arrangement, and characteristics of motors (see example below). When using a different number of motors or in a drastically different configuration the shape of the geometric control envelope 104 may be altered upon maximizing the speed range of each motor. Anything that causes the mapping of roll, pitch, yaw, and thrust flight commands to each of the motors to change will lead to a slightly different geometric control envelope 104 shape. A given geometric control envelope shape may also be modified to become another shape such as a cone instead of a wedge-pyramid in order to simplify the relationship between desired operation point 106 and closest point 108.

In one embodiment, the geometric control envelope 104 may be a wedge-pyramid shape derived from using four motors 14A-D arranged as corners of a square and allowing the motors 14A-D to reach their extreme speed limits of 0% and 100% with two motors on opposite corners providing counterclockwise yaw torque and the other two motors providing clockwise yaw torque. The motors 14A-D can be either all coplanar or relatively close to coplanar. Once again, the shape of the geometric control envelope 104 is based on the arrangement and orientation of the motors 14A-D. That arrangement and orientation leads to a certain motor mapping between thrust, yaw, and tilt to motor speeds. If the mapping is different for any reason (typically due to a different orientation/arrangement of thrusters), then the geometric control envelope shape would be different too.

The base of the wedge-pyramid shape may be in a plane defined by a yaw axis and a thrust axis. The wedge-pyramid shape may extend from the base along a tilt axis. The base may have one point at 0 degrees yaw, 0 degrees tilt, and 0 thrust, and an extreme thrust point at 0 degrees yaw, 0 degrees tilt, and thrust equal to 1 (100%). The base may further have two points at 0.5 (50%) thrust, 0 degrees tilt, and the maximum amplitude positive and negative yaw values given 50% thrust and 0 degrees tilt. The height of the wedge-pyramid from its base is at the absolute maximum tilt that could be applied for the perfect combination of thrust, yaw, and tilt. Typically, this can be found when yaw is 0 and thrust is 0.5 (50%). However, for some mappings, this maximum point could be at a different point in the yaw and thrust axes.

The axis of attitude rotation (pitch/roll rotation) determines the current shape and size of the wedge-pyramid, so throughout the flight the wedge-pyramid is usually warping. The angle of this axis of attitude rotation may be called "theta" ($\theta$). Theta could be represented as an axis of the shape being modeled, but it may be desirable to preserve theta above all else. So, if the higher level flight control determines torque needs to be about an axis which is 21 degrees counterclockwise of straight forward on the drone 10 for example, the geometric space 102 and geometric control envelope construction ensures that the torque will indeed be about an axis 21 degrees counterclockwise of straight forward; it just may be that the amount of torque about that axis is less.

As suggested by its name, the current shape of the wedge-pyramid can be a pyramid, a wedge, or in-between depending on the theta angle. For thetas of 0, 90, 180, and 270 degrees, the current shape may be a pyramid where all of its sides except the base come to a single point at its top. The base may be a parallelogram. As the theta value deviates from those four angles, the top turns into an edge which makes the current shape closer to a wedge. Once the theta reaches 45 degrees (shown as 0.7854 radians in FIG. 4), 135 degrees, 225 (i.e., −135 degrees), or 315 degrees (i.e., −45 degrees, shown as 0.7854 radians in FIG. 5), then two of the non-base sides of the wedge-pyramid become completely parallel and the other two non-base sides become parallelograms, thus forming a wedge. Any theta angle in between, such as −22 degrees (shown as −0.38051 radians in FIG. 6), leads to a current shape between a pure pyramid and wedge. The geometric control envelope 104 may also change according to factors such as battery levels and therefore available thrust and yaw authority as they dynamically change as batteries are exhausted.

In certain embodiments and situations, the geometric control envelope 104 may temporarily have an additional "governor" face, such as additional face 110, parallel with one of the defining planes (usually the yaw/tilt plane), effectively cutting off a portion of the geometric control envelope 104 and forming a ceiling (or floor or sidewall, depending on its orientation). In the case of additional face 110 being parallel with the yaw/tilt plane, the additional face 110 defines a maximum or preferred thrust. The additional face 110 may be included so that when the thrust value of the desired operation point 106 is low, the closest point 108 on the geometric control envelope 104 does not have a thrust value higher than a thrust value of the desired operation point 106. This prevents a dangerous situation which could lead the drone to rise unexpectedly during the flight.

In FIG. 7 the additional face 110 is present but does not affect the location of the closest point 108 because the closest point 108 is on a face just adjacent to an edge which joins that face to the additional face 110. In FIG. 8, the desired operation point 106 is near a downward-facing face.

Because the additional face 110 is also at the same thrust value as the thrust value of the desired operation point 106 and the downward-facing face is actually facing away from the desired operation point 106, then the closest point 108 is not on a face but rather is on an edge of the geometric control envelope 104. If the additional face 110 was not used, the closest point 108 would be on the downward-facing face instead of on an edge and the thrust value of the closest point 108 would be greater than the thrust value of the desired operation point 106. In some cases this increase in thrust could be unacceptably high which could lead to a crash. This limitation in thrust is why the additional face 110 may be implemented in some circumstances.

This may be implemented via Geometric Algebra (such as described in U.S. patent application Ser. No. 16/219,609, published as US Pat. App. Pub. No. 2019/0179345, incorporated by reference herein in its entirety). Geometric Algebra provides several advantages, but other mathematical approaches may also be used.

A shape data set describing the shape of the wedge-pyramid of the above example was determined by finding the limits of tilt, yaw, and thrust for various thetas which lead to motor speeds limiting at 100% or 0%. This defined a 3-dimensional shape. Through mathematical analysis, mathematical planes were found which defined surfaces of the 3-dimensional shape. These mathematical planes may be described by various means including combinations of vectors, matrices, scalars, or geometric algebra multi-vectors.

Finding the closest point 108 on the wedge-pyramid geometric control envelope 104 may be performed according to the steps below. These steps are described generically so that they can be carried out with any form of math that can be used for analyzing geometric shapes. For example, they can be performed via matrices/vectors or with various forms of geometric algebra.

First, pre-calculate constants associated with parameters, faces, edges, points, and other features. Then determine a magnitude of a desired tilt. This may be a scaled magnitude of a deflection of a right stick input in a combination of x and y control axes. Then calculate corner point data. Then calculate faces with scaled dimensions according to an initial scaling factor. Then calculate the desired operation point with scaled dimensions. Then find the closest operation point on the scaled faces. Then discard operation points that are on a face facing away from the desired operation point. Then discard operation points that are outside the geometric control envelope 104.

If no operation point is found to be bounded by the faces (and hence within or on the geometric control envelope 104), then do the following sub-steps. First, find the closest operation point on any edge of the geometric control envelope 104. Then discard operation points that are outside the geometric control envelope 104. Then find any corner points on the geometric control envelope 104 that are closer than the closest operation point if the closest operation point is on an edge of the geometric control envelope 104. Then rescale the closest operation point by the reciprocal of the initial scaling factor used in the earlier steps. Then input the rescaled closest operation point to the motor mapping step.

For the following examples consider total thrust ($T_t$) to be equal to the sum of the percentages of all four motors 14A-D. The pitch thrust difference ($T_p$) will be the sum of motors 14A and 14D minus the sum of motors 14B and 14C. The roll thrust difference ($T_r$) will be the sum of motors 14C and 14D minus the sum of motors 14A and 14B. And finally, the yaw thrust difference ($T_y$) will be the sum of motors 14A and 14C minus the sum of motors 14B and 14D.

Theta ($\theta$) describes an angle of the torque axis in a horizontal plane of the drone 10 relative to a reference axis extending forward and backward through a center of the drone 10 in the horizontal plane. The torque axis coinciding with the reference axis corresponds to $\theta$ of 0 degrees. As the torque axis rotates clockwise from above, $\theta$ increases.

To map from commands to motor settings:

$$M_0 = \tfrac{1}{4}(T_t + T_p - T_r + T_y) =$$

$$M_1 = \tfrac{1}{4}(T_t - T_p - T_r - T_y)$$

$$M_2 = \tfrac{1}{4}(T_t - T_p + T_r + T_y)$$

$$M_3 = \tfrac{1}{4}(T_t + T_p + T_r - T_y)$$

To map from motor settings back to commands:

$$T_t = M_0 + M_1 + M_2 + M_3$$

$$T_p = (M_0 + M_3) - (M_1 + M_2)$$

$$T_r = (M_2 + M_3) - (M_0 + M_1)$$

$$T_y = (M_0 + M_2) - (M_1 + M_3)$$

To describe $T_p$ and $T_r$ in terms of tilt and $\theta$:

$$T_r = \cos(\theta)\text{tilt}$$

$$T_p = \sin(\theta)\text{tilt}$$

To calculate tilt from $T_p$ and $T_r$:

$$\text{tilt} = \sqrt{T_p^2 + T_r^2}$$

As an example, if the desired command for the drone 10 was to simply provide $T_t = 200\%$ thrust, $T_p = 0\%$ pitch thrust difference, $T_r = 0\%$ roll thrust difference, and $T_y = 0\%$ yaw thrust difference, the mapping would lead to a 50% thrust setting on all four motors 14A-D. This command is possible for the drone 10 to achieve. However, in another case the command may require a strong pitching-up torque motion of the drone 10 while accelerating upwards. Numerically this could mean $T_t = 380\%$ total thrust, $T_p = 60\%$ pitch thrust difference, $T_r = 0\%$ roll thrust difference, and $T_y = 0\%$ yaw thrust difference. The simple mapping function requests the front two motors (motors 14A and 14D) to go to 110% and the back two motors (motors 14B and 14C) to go to 80%. In this case, the back two motors 14B and 14C can achieve the 80% setting, but because the control system 18 can only make the motors 14A-D go up to 100%, the front two motors 14A and 14D saturate at 100%. Consequently, the drone's motion does not follow the desired motion which is fed into the mapping function. In this case, the drone 10 would not pitch with the amount of torque it would have pitched with if the mapping had been possible and the total upward thrust of the drone 10 is slightly less than it would have been otherwise. The actual effective commands would be $T_t = 360\%$ total thrust, $T_p = 40\%$ pitch thrust difference, $T_r = 0\%$ roll thrust difference, and $T_y = 0\%$ yaw thrust difference.

No matter what, whenever maximum or minimum limits on the motors 14A-D of the drone 10 are reached, the drone 10 will not precisely do what was originally desired. However, it is best if the drone 10 can achieve predictable behavior by attempting to follow the most important commands while relaxing from the other commands.

A more extreme example will now be described. In this case, the drone 10 is not to have any yaw torque at all, has quite a bit of thrust, and has a combination of pitch and roll torque. Numerically, the goals may be to apply $T_t = 410\%$ total thrust, $T_p = 40\%$ greater thrust on the drone's front side versus the drone's back side for pitch, $T_r=-50\%$ greater thrust on the drone's left side versus the drone's right side for roll, and $T_y=0\%$ greater thrust on motors 14A and 14C vs motors 14B and 14D for yaw. Motor mapping would cause motor 14A to be at 125%, motor 14B to be at 105%, motor 14C to be at 80%, and motor 14D to be at 100%. However, because 100% is the actual maximum value, the actual settings on each motor 14A-D end up being 100%, 100%, 80%, and 100%. This still provides 380% thrust. The pitch difference drops to 20% and the roll thrust drops to −20%. This means the axis of the pitch and roll torque change in addition to the amount of pitch and roll torque. Additionally, the yaw thrust difference ends up being −20%. If the drone 10 previously was not spinning in its yaw axis and has no external torques on it, this adjustment causes the drone 10 to start spinning about its yaw axis. This goes against the original flight command but may not matter as significantly as the change in command for pitch and roll. This is because pitch and roll relate to the attitude of the drone 10 which significantly affects lateral motion. Ultimately, the present invention compromises inputs to the motors 14A-D such that the drone 10 follows more important control aspects of the flight commands while putting less emphasis on less important control aspects.

Certain embodiments of the invention will now be described. One embodiment is a method of controlling a vehicle. The method includes, via a processor of the vehicle, generating a geometric control envelope in a geometric space of operation points defined by a plurality of control aspects, the geometric control envelope having vertices representing maximum values of the control aspects such that operation points outside the geometric control envelope represent operational conditions unattainable by a plurality of propulsion mechanisms of the vehicle and operation points in the geometric control envelope represent operational conditions attainable by the plurality of propulsion mechanisms. The method further includes determining a desired operation point in the geometric space representing a control input; determining whether the desired operation point is in the geometric control envelope. The method further includes instructing the plurality of propulsion mechanisms to propel the vehicle according to the desired operation point if the desired operation point is in the geometric control envelope. The method further includes scaling up a first one of the control aspects by a first factor, determining an effective operation point in the geometric control envelope geometrically closest to the desired operation point, scaling down all of the control aspects by a second factor inverse of the first factor, and instructing the plurality of propulsion mechanisms to propel the vehicle according to the effective operation point if the desired operation point is outside the geometric control envelope.

In another embodiment, the plurality of control aspects including yaw, tilt, and thrust. In another embodiment, the geometric control envelope may be influenced by a control aspect theta representing a horizontal axis attitude rotation of the vehicle. In another embodiment, the geometric control envelope forms a parallelogram pyramid for values of theta in a first set of values, a wedge for values of theta in a second set of values, and a hybrid shape for values of theta in a third set of values. In another embodiment, the geometric control envelope forms a cone.

In another embodiment, the method further includes establishing a hierarchy of priority between the plurality of control aspects, the first one of the control aspects being a control aspect having a highest priority in the hierarchy. In another embodiment, the method further includes establishing a ceiling for one of the plurality of control aspects so that the geometric control envelope includes a face corresponding to the ceiling. In another embodiment, determining the effective operation point includes disregarding operation points outside of the geometric control envelope and disregarding operation points on faces of the geometric control envelope facing away from the desired operation point.

In another embodiment, determining the effective operation point includes determining a closest operation point on an edge of the geometric control envelope representing an intersection of two faces of the geometric control envelope. In another embodiment, determining the effective operation point includes determining the closest operation point is a corner point of the geometric control envelope representing an intersection of two edges of the geometric control envelope. In another embodiment, instructing the plurality of propulsion mechanisms to propel the vehicle according to the effective operation point includes mapping the effective operation point to a propulsion mechanism output, and instructing the plurality of propulsion mechanisms to propel the vehicle according to the effective operation point includes sending a signal representing the propulsion mechanism output to the plurality of propulsion mechanisms.

Another embodiment is a vehicle comprising a chassis, a plurality of propulsion mechanisms configured to propel the chassis, and a processor. The processor is configured to generate a geometric control envelope in a geometric space of operation points defined by a plurality of control aspects. The geometric control envelope has vertices representing maximum values of the control aspects such that operation points outside the geometric control envelope represent operational conditions unattainable by a plurality of propulsion mechanisms of the vehicle and operation points in the geometric control envelope represent operational conditions attainable by the plurality of propulsion mechanisms.

The processor is further configured to determine a desired operation point in the geometric space representing a control input. The processor is further configured to determine whether the desired operation point is in the geometric control envelope. The processor is further configured to instruct the plurality of propulsion mechanisms to propel the vehicle according to the desired operation point if the desired operation point is in the geometric control envelope.

The processor is further configured to scale up a first one of the control aspects by a first factor, determine an effective operation point in the geometric control envelope geometrically closest to the desired operation point, scale down all of the control aspects by a second factor inverse of the first factor, and instruct the plurality of propulsion mechanisms to propel the vehicle according to the effective operation point if the desired operation point is outside the geometric control envelope.

In another embodiment, the plurality of control aspects including yaw, tilt, and thrust. In another embodiment, the geometric control envelope is influenced by a control aspect theta representing a horizontal axis attitude rotation of the vehicle. In another embodiment, the geometric control envelope forms a parallelogram pyramid for values of theta in a first set of values, a wedge for values of theta in a second set of values, and a hybrid shape for values of theta in a third set of values. In another embodiment, the processor is further configured to establish a hierarchy of priority between the plurality of control aspects, the first one of the control aspects being a control aspect having a highest priority in the hierarchy. In another embodiment, the processor is further configured to establish a ceiling for one of the plurality of control aspects so that the geometric control envelope includes a face corresponding to the ceiling.

In another embodiment, in determining the effective operation point, the processor is further configured to disregard operation points outside of the geometric control envelope and disregard operation points on faces of the geometric control envelope facing away from the desired operation point. In another embodiment, in determining the effective operation point, the processor is further configured to determine a closest operation point on an edge of the geometric control envelope representing an intersection of two faces of the geometric control envelope. In another embodiment, in determining the effective operation point, the processor is further configured to determine the closest operation point is a corner point of the geometric control envelope representing an intersection of two edges of the geometric control envelope.

In another embodiment, in instructing the plurality of propulsion mechanisms to propel the vehicle according to the effective operation point, the processor is further configured to map the effective operation point to a propulsion mechanism output. In another embodiment, in instructing the plurality of propulsion mechanisms to propel the vehicle according to the effective operation point, the processor is further configured to send a signal representing the propulsion mechanism output to the plurality of propulsion mechanisms.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

The invention claimed is:

1. A method of controlling a vehicle, the method comprising, via a processor of the vehicle:
generating a geometric control envelope in a geometric space of operation points defined by a plurality of control aspects, the geometric control envelope having vertices representing maximum values of the control aspects such that operation points outside the geometric control envelope represent operational conditions unattainable by a plurality of propulsion mechanisms of the vehicle and operation points in the geometric control envelope represent operational conditions attainable by the plurality of propulsion mechanisms;
determining a desired operation point in the geometric space representing a control input;
determining whether the desired operation point is in the geometric control envelope;
if the desired operation point is in the geometric control envelope, instructing the plurality of propulsion mechanisms to propel the vehicle according to the desired operation point; and
if the desired operation point is outside the geometric control envelope,
scaling up a first one of the control aspects by a first factor;
determining an effective operation point in the geometric control envelope geometrically closest to the desired operation point;
scaling down all of the control aspects by a second factor inverse of the first factor; and
instructing the plurality of propulsion mechanisms to propel the vehicle according to the effective operation point.

2. The method of claim 1, the plurality of control aspects including yaw, tilt, and thrust.

3. The method of claim 1, wherein the geometric control envelope forms a cone.

4. The method of claim 1, further comprising a step of establishing a hierarchy of priority between the plurality of control aspects, the first one of the control aspects being a control aspect having a highest priority in the hierarchy.

5. The method of claim 1, further comprising a step of establishing a ceiling for one of the plurality of control aspects so that the geometric control envelope includes a face corresponding to the ceiling.

6. The method of claim 1, the step of instructing the plurality of propulsion mechanisms to propel the vehicle according to the effective operation point including a step of mapping the effective operation point to a propulsion mechanism output, the step of instructing the plurality of propulsion mechanisms to propel the vehicle according to the effective operation point including sending a signal representing the propulsion mechanism output to the plurality of propulsion mechanisms.

7. The method of claim 1, the geometric control envelope being influenced by a control aspect theta representing a horizontal axis attitude rotation of the vehicle.

8. The method of claim 7, wherein the geometric control envelope forms a parallelogram pyramid for values of theta in a first set of values, a wedge for values of theta in a second set of values, and a hybrid shape for values of theta in a third set of values.

9. The method of claim 1, the step of determining the effective operation point including steps of:
disregarding operation points outside of the geometric control envelope; and
disregarding operation points on faces of the geometric control envelope facing away from the desired operation point.

10. The method of claim 9, the step of determining the effective operation point including a step of:
determining a closest operation point on an edge of the geometric control envelope representing an intersection of two faces of the geometric control envelope.

11. The method of claim 10, the step of determining the effective operation point including a step of:
determining the closest operation point is a corner point of the geometric control envelope representing an intersection of two edges of the geometric control envelope.

12. A vehicle comprising:
a chassis;
a plurality of propulsion mechanisms configured to propel the chassis; and
a processor configured to:
generate a geometric control envelope in a geometric space of operation points defined by a plurality of control aspects, the geometric control envelope having vertices representing maximum values of the control aspects such that operation points outside the geometric control envelope represent operational conditions unattainable by a plurality of propulsion mechanisms of the vehicle and operation points in the geometric control envelope represent operational conditions attainable by the plurality of propulsion mechanisms;
determine a desired operation point in the geometric space representing a control input;

determine whether the desired operation point is in the geometric control envelope;

if the desired operation point is in the geometric control envelope, instruct the plurality of propulsion mechanisms to propel the vehicle according to the desired operation point; and if the desired operation point is outside the geometric control envelope, scale up a first one of the control aspects by a first factor;

determine an effective operation point in the geometric control envelope geometrically closest to the desired operation point;

scale down all of the control aspects by a second factor inverse of the first factor; and instruct the plurality of propulsion mechanisms to propel the vehicle according to the effective operation point.

13. The vehicle of claim 12, the plurality of control aspects including yaw, tilt, and thrust.

14. The vehicle of claim 12, the processor being further configured to establish a hierarchy of priority between the plurality of control aspects, the first one of the control aspects being a control aspect having a highest priority in the hierarchy.

15. The vehicle of claim 12, the processor being further configured to establish a ceiling for one of the plurality of control aspects so that the geometric control envelope includes a face corresponding to the ceiling.

16. The vehicle of claim 12, wherein:

in instructing the plurality of propulsion mechanisms to propel the vehicle according to the effective operation point, the processor is further configured to map the effective operation point to a propulsion mechanism output; and in instructing the plurality of propulsion mechanisms to propel the vehicle according to the effective operation point, the processor is further configured to send a signal representing the propulsion mechanism output to the plurality of propulsion mechanisms.

17. The vehicle of claim 12, the geometric control envelope being influenced by a control aspect theta representing a horizontal axis attitude rotation of the vehicle.

18. The vehicle of claim 17, wherein the geometric control envelope forms a parallelogram pyramid for values of theta in a first set of values, a wedge for values of theta in a second set of values, and a hybrid shape for values of theta in a third set of values.

19. The vehicle of claim 12, wherein in determining the effective operation point, the processor is further configured to:

disregard operation points outside of the geometric control envelope; and disregard operation points on faces of the geometric control envelope facing away from the desired operation point.

20. The vehicle of claim 19, wherein in determining the effective operation point, the processor is further configured to:

determine a closest operation point on an edge of the geometric control envelope representing an intersection of two faces of the geometric control envelope.

21. The vehicle of claim 20, wherein in determining the effective operation point, the processor is further configured to:

determine the closest operation point is a corner point of the geometric control envelope representing an intersection of two edges of the geometric control envelope.

22. A method of controlling a vehicle, the method comprising, via a processor of the vehicle:

receiving a flight command;

generating a wedge-pyramid geometric control envelope in a geometric space of operation points defined by tilt, yaw, thrust, and tilt axis angle, the geometric control envelope having vertices representing maximum values of the tilt and yaw, and a face representing maximum values of the thrust, such that operation points outside the geometric control envelope represent operational conditions unattainable by four propulsion mechanisms of the vehicle and operation points in the geometric control envelope represent operational conditions attainable by the four propulsion mechanisms;

determining a desired operation point in the geometric space corresponding to the flight command;

determining whether the desired operation point is in the geometric control envelope;

if the desired operation point is in the geometric control envelope, instructing the plurality of propulsion mechanisms to propel the vehicle according to the desired operation point; and if the desired operation point is outside the geometric control envelope, scaling up a first one of the control aspects by a first factor;

determining an effective operation point in the geometric control envelope geometrically closest to the desired operation point;

scaling down all of the control aspects by a second factor inverse of the first factor; and instructing the plurality of propulsion mechanisms to propel the vehicle according to the effective operation point.

* * * * *